Figure 5:
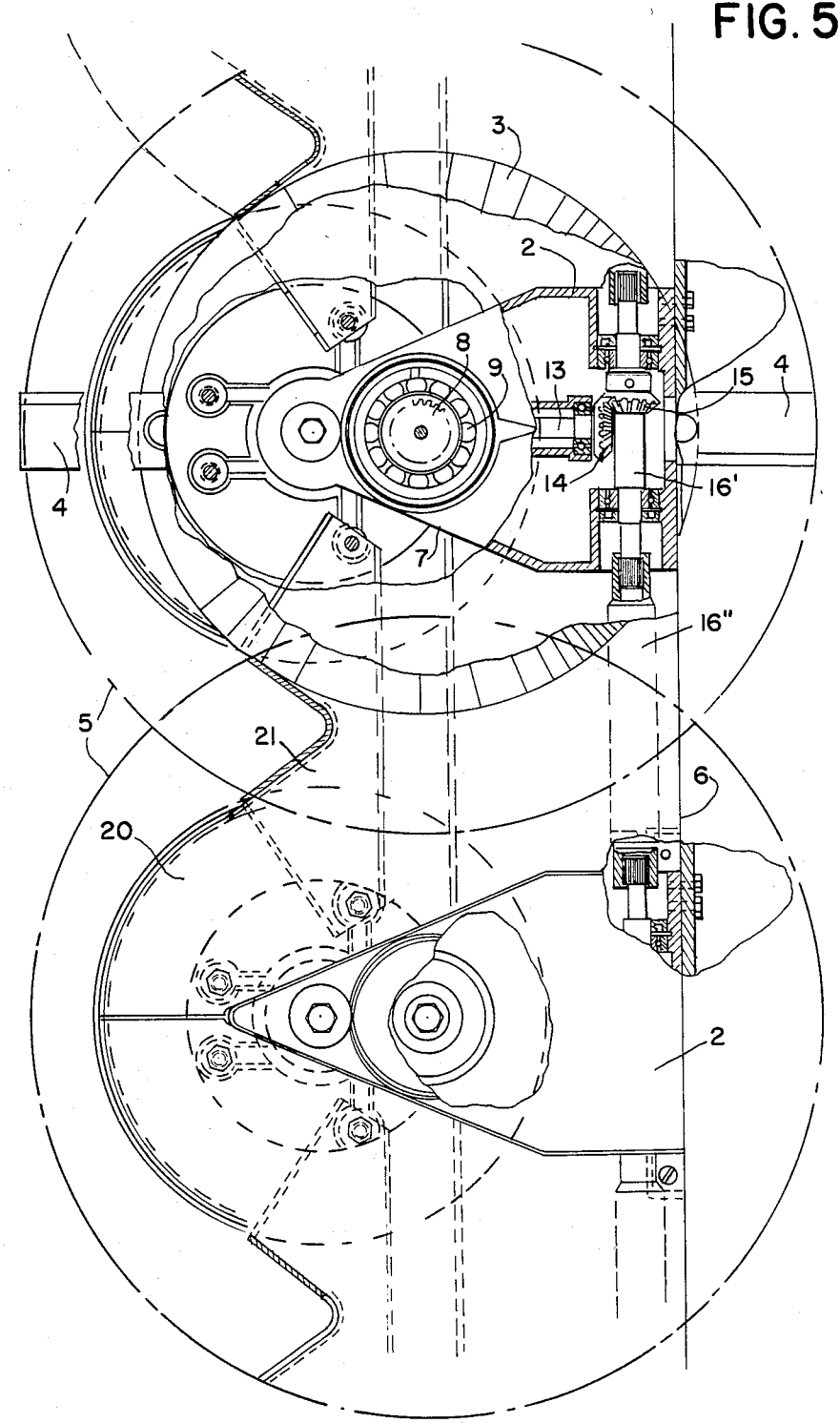

United States Patent [19]

Vissers et al.

[11] Patent Number: 4,497,161
[45] Date of Patent: Feb. 5, 1985

[54] MOWER

[75] Inventors: Hermanus H. Vissers; Hendrikus C. Van Staveren, both of Nieuw-Vennep, Netherlands

[73] Assignee: Multinorm, B.V., Nieuw-Vennep, Netherlands

[21] Appl. No.: 395,665

[22] Filed: Jul. 6, 1982

[30] Foreign Application Priority Data

Jul. 17, 1981 [NL] Netherlands ............ 8103411

[51] Int. Cl.³ .................... A01D 55/18
[52] U.S. Cl. .................... 56/13.6; 56/192
[58] Field of Search ............ 56/10.4, 11.8, 12.7, 56/13.6, 192, DIG. 6, DIG. 16, DIG. 17, 295, 157

[56] References Cited

U.S. PATENT DOCUMENTS 3,507,102 4/1970 Kline et al. .................... 56/13.6
4,227,365 10/1980 VanderLehy et al. .............. 56/13.6
4,244,163 1/1981 Grantzer et al. ................. 56/13.6
4,302,921 12/1981 Weber .......................... 56/13.6

FOREIGN PATENT DOCUMENTS 1212892 11/1970 France ................... 56/13.6
2294625 12/1974 France ................... 56/13.6
1813612 8/1978 France ................... 56/13.6
2454748 12/1980 France ................... 56/13.6
7811310 3/1979 Netherlands ............. 56/295
2059236 4/1981 United Kingdom ......... 56/13.6

Primary Examiner—Gene Mancene
Assistant Examiner—John G. Weiss
Attorney, Agent, or Firm—Diller, Ramik & Wight

[57] ABSTRACT

A device for mowing agricultural crops, particularly grass, mainly comprising a continuous main beam (1) bearing a common main drive and a plurality of housings fastened to the front side of said beam (1), each accommodating an intermediate drive to an upstanding rotary shaft for a cutting member (3), wherein each housing is further provided with a freely rotatable member (52) bearing on the ground, and wherein the cutting members are connected through a safety clutch with the rotary shaft so that damage of the transmission gears in the drive due to jamming of the cutting member can be avoided, an undisturbed rearward transport of the crop is ensured and a free, overlapping moving region between two adjacent cutting members is obtained.

15 Claims, 11 Drawing Figures

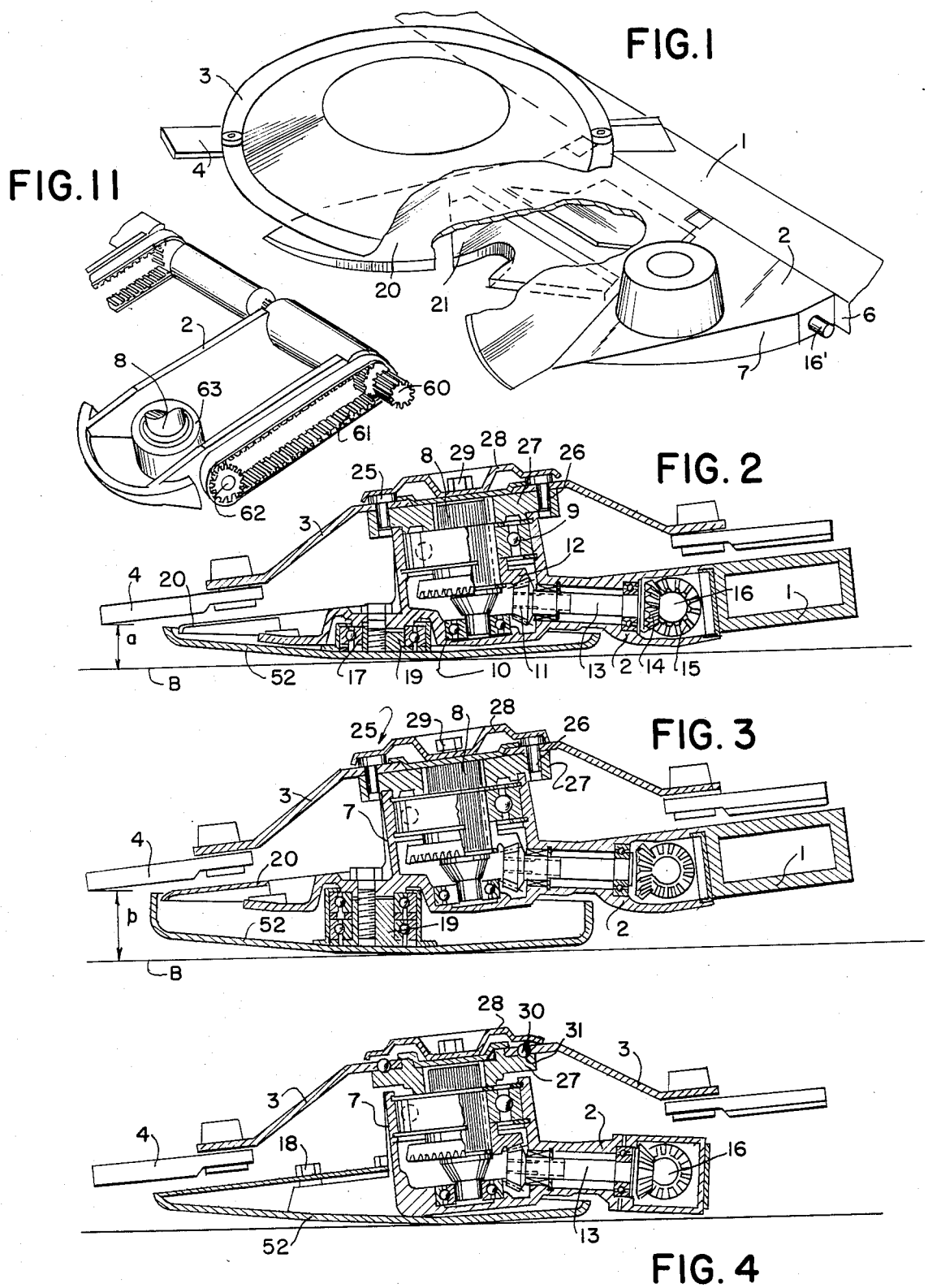

MOWER

The invention relates to a device for mowing agricultural crops, particularly grass, mainly comprising a frame movable across the field having a cutter bar extending transversely of the direction of movement near the ground and comprising at least two cutting members to be rotated about upwardly extending shafts driven by a common mechanic main drive, the front boundary edge of the cutter bar being drawn back between the cutting members in order to obtain a free, overlapping mowing region between two neighbouring cutting members.

A device of the type set forth in the preamble is usually employed for mowing long-blade grass, in which the blades are conducted away after cutting over and across the cutting members and the cutter bar and thus deposited in a comparatively broad swath. This broad swath is conducive to drying of the crop. The transport of the crop over and across the cutter bar is usually performed by the cutting members themselves or by a separate transport member located above the cutter bar. With such a kind of machine the free, overlapping mowing regions between the neighbouring cutting members serve to minimize adhesion of the cut crop conveyed to the rear to the front rim of the cutter bar. However in practice the cutter bar itself is usually beating on the ground in order to minimize the height of the stubbles. However, dragging the cutter bar along the ground has a bulldozer effect, which means that earth and/or crop are driven up so that the free, overlapping mowing range is adversely affected and a satisfactory conveyance to the rear is impeded. Moreover, the cutter will slide more heavily on the ground and be lifted so that the height of the stubbles becomes greater.

The invention has for its object to ensure for a machine of the kind set forth in the preamble an effective, undisturbed rearward transport without the aforesaid, disadvantageous bulldozer effect, while the possibility of making a broad swath of cut crop is maintained.

The device according to the invention is distinguished in that at two or more cutting members the cutter bar is provided with a member bearing on the ground. Thanks to this separate supporting member the underside of the cutter bar can anywhere be kept free of the ground so that the bulldozer effect is avoided.

In order to counteract an accumulating effect of the supporting member itself, this member is constructed in a circular shape in a further development of the invention, while it is freely rotatable below the cutter bar.

In order to obtain a minimum height of the cutting member above the ground, the rotary shaft of the supporting member is arranged, with respect to the direction of movement, on front of the rotary shaft of the cutting member, which provides in addition, the advantage that the supporting point is located as near as possible to the foremost mowing region of the cutting members.

The invention has furthermore for its object to ensure a maximum free overlapping mowing region for which purpose an intermediate drive is arranged between the common main drive and each rotary shaft of the cutting members so that the main drive can be arranged far to the rear which involves an enlargement of said free overlapping mowing region of the neighbouring cutting members.

In a preferred embodiment the cutter bar is formed by a continuous main beam and a housing fastened to the front side and accomodating the intermediate drive and the rotary shaft of each cutting member. This has the advantage that each cutting member with the housing carrying the same can be fastened as a mounting unit to the uninterrupted beam so that replacement in the case of wear or damage is simplified. Moreover, the overall working width of the device can be readily adapted to the user's requirements, since a greater or smaller number of cutting units can be fastened accordingly to the uninterrupted beam. The cutter bar may, as an alternative, be composed of relatively coupled segments.

The main the intermediate drives may be of any desired design, that is to say, interengaging pinions, ropes or the like may be used. The embodiment of the device described hereinafter comprises, however, a bevel gear wheel transmission, in which the main driving shaft extends along the outer side of the cutter bar between the housings of the cutting units. The transmission occurs by means of bevel gear wheels so that the desired speed of rotation of the cutting members and the direction of rotation can be chosen in a simple manner.

It is preferred to connect the cutting members through a safety clutch with the rotary shaft so that damage of the transmission gears in the drive due to jamming of the cutting member can be avoided.

The invention will be described more fully hereinafter with reference to a few embodiments.

Figure 6:
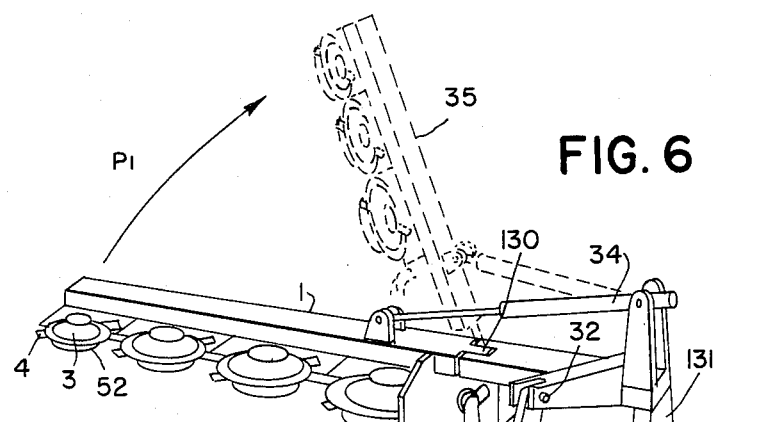

The drawing shows in:

FIG. 1 a perspective plan view of part of the cutter bar with two cutting members, one of which is omitted, FIGS. 2, 3 and 4 three vertical cross-sectional views of the cutter bar and a cutting unit in three embodiments, FIG. 5 a plan view of a cutter bar having two cutting units of the kind shown in FIG. 1, FIG. 6 a frame of the mower designed for attachment to the three-point lift of an agricultural tractor, FIGS. 7, 8, 9, 10, and 11 potential designs of the main and intermediate drives in a mower embodying the invention, Referring to the figures reference numeral 1 designates the continuous cutter bar provided at the front with a plurality of housings 2 coupled and each carrying a rotatably driven cutting member formed by a disc 3 with two diametrically opposite cutters 4. The drive of the cutting members 3 is mechanical such that the discs 3 rotate in relative synchronism while the cutting ranges of the cutters 4 of two neighbouring discs overlap one another (see the dot-and-dash line 5 in FIG. 5).

The foremost boundary rim of the cutter bar is formed by the uninterrupted front side 6 of the cutter bar 1 and the vertical front side 7 of each housing 2 respectively is set back to an extent such that this rim is located outside the overlapping mowing region (see also FIG. 5).

It will be seen from FIGS. 2, 3 and 4 that each housing 2 accomodates the standing rotary shaft 8 of each disc 3 so as to be rotatable by means of small bearings 9, 10. Below the ball bearing 9 is secured to the shaft 8 a bevel gear wheel 12, which co-operates with a bevel gear wheel 11 of the intermediate driving shaft 13, which extends to the rear with respect to the direction of movement and is provided at the other end with a bevel gear wheel 14, which co-operates with a bevel gear wheel 15 of the main driving shaft 16 (see also FIG. 5).

The intermediate driving shaft 13 is arranged in the housing 2 by means of roller bearings. The vertex of the bevel gear wheel 14 is larger than that of the gear wheel 11 so that the reactive force resulting from the drive is directed to the left as viewed in FIGS. 2 to 4, said reactive force being absorbed by the right-hand ball bearing so that on the left-hand side a needle bearing may be used and the building-in height can be smaller.

Furthermore the bevel gear transmission is proportioned so that the angle between the standing shaft and the intermediate shaft is larger than 90°. Thus the standing shaft is inclined forward so that a small height of the stubbles is ensured.

Each housing 2 is provided with a supporting member 52, which as is shown in FIGS. 2, 3 is constructed in the form of a circular disc, which is fastened to the underside of the housing 2 so as to be freely rotatable by means of a bearing 17. In the embodiment shown in FIG. 4 the supporting member 52 is fixedly secured by means of bolts 18 to the housing 2.

By varying the height of the rotary shaft 19 of the rotatable supporting dishes 52 of FIGS. 2 and 3 the height of the cutter 4 above the ground B can be varied; see the difference a with respect to b in FIGS. 2 and 3 respectively. The rotatable structure of the supporting member 52 in these Figures is covered at the top by a cover plate 20, which is rigidly secured to the housing 2. If necessary the cover plate 20 can be prolonged to the front rim of the uninterrupted main beam 1 of the cutter bar, while for use on stony land the front rim of the cover plate 20 between two neighbouring cutting members may be protected by a stone-capturing member 21 (see also FIG. 5).

In the embodiment shown in FIGS. 1, 2, 3, and 5 the main driving shaft 16 extends in front along the uninterrupted main beam 1 and comprises a shaft portion 16' journalled in each housing 2 and an intermediate shaft portion 16" non-rotatably but slidably connected with each shaft portion 16' along the front side of the beam. Such a construction facilitates the exchange of a housing with respect to the cutter bar 1.

Figures 9, 10:
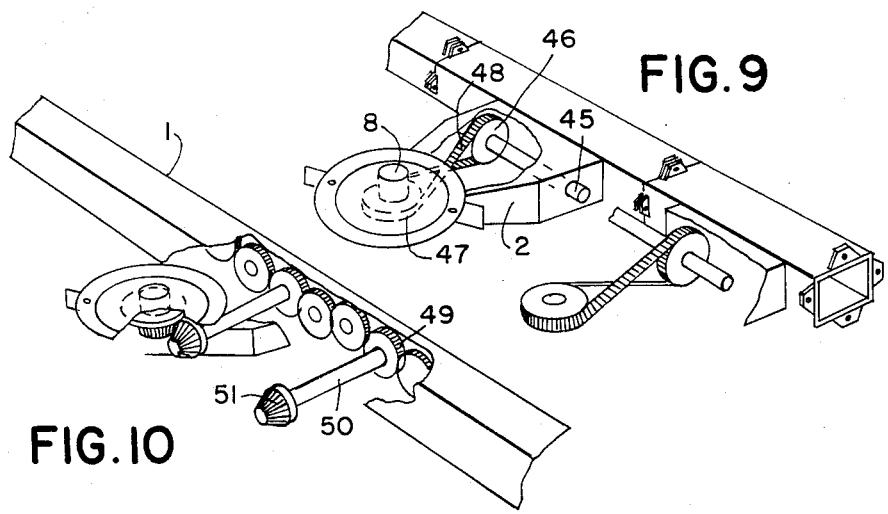

As shown in FIG. 4 the cutter bar comprises segments that can be coupled with one another as is shown by way of example in FIG. 9. The main driving shaft 16 is arrangeed in the hollow cutter bar part 1 and, therefore, the intermediate shaft 13 extends as far as into the cutter bar part 1.

Each cutting disc 3 is rigidly connected through a safety clutch 25 with the rotary shaft 8. As shown in FIGS. 2 and 3 the safety clutch comprises shear bolts 26 arranged in a circle and passed through holes in the disc 3 and inserted into registering holes in a disc 27 connected with the shaft 8. The bolts 26 are retained by a cover plate 28, which is fastened to the shaft 8 by means of a central bolt 29. In the event of overload the bolts 26 will break off so that they have to be replaced after the cover plate 28 is removed. The heads of the bolts may be united to form a single unit.

FIG. 4 shows an embodiment in which the cover plate 28 is a resilient plate, which serves to depress balls 30 arranged in holes of the disc 3 and fitting in recesses 31 of the disc 27. In the event of heavy resistance the balls 30 will snap out of the recesses 31 so that the direct rotary joint between shaft 8 and disc 3 is interrupted. Without further dismounting the connection can be re-established by sufficiently turning the disc 3 with respect to the disc 27 so that the balls 30 again snap into the recesses 31. The position of the balls 30 and the recesses 31 respectively is such that the cutters 4 of neighbouring cutting members maintain their correct relative positions.

FIG. 6 shows an embodiment of a complete device comprising a cutter bar 1 with four cutting units formed by cutting discs 3 and supporting members 52 fastened to the front side of the cutter bar. In this embodiment the cutter bar 1 extends behind the mowing regions of the cutters 4, which does not at all affect the object of the invention, that is to say, supporting the uninterrupted cutter bar 1 at a height with respect to the ground.

By means of a hinge 130, the cutter bar 1 is pivotally connected with a main frame 31, which is attached through the three-point hitch to an agricultural tractor 33.

A hydraulic ram 34 between the frame 31 and the cutter bar 1 can move upwards this bar with the cutting units in the direction of the arrow P1 into the road position indicated by the broken line 35.

FIGS. 7, 8, 9 and 10 show alternative embodiments of the main and the intermediate drives respectively.

Figures 7, 8:
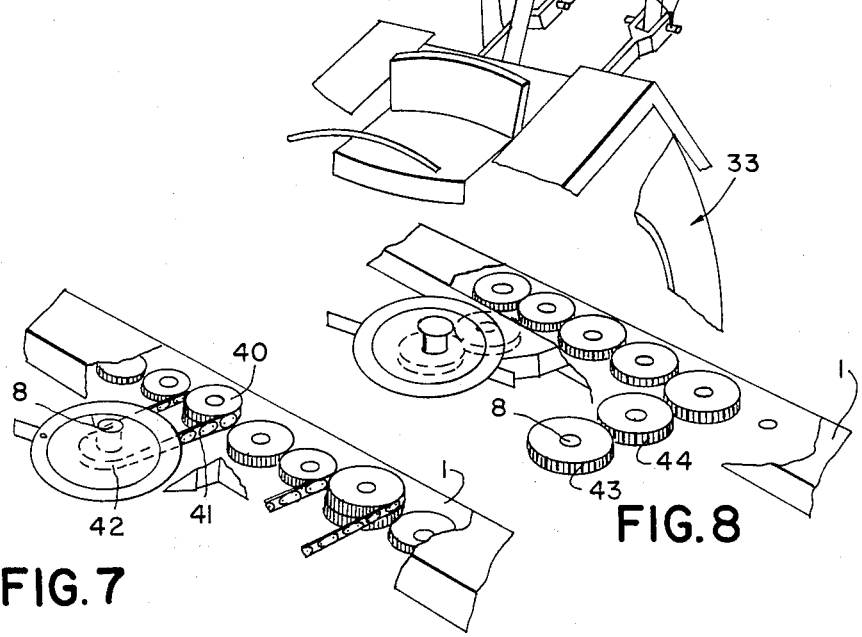

FIG. 7 shows the conventional, interengaging gear wheels in the cutter bar, in which for every three gear wheels a sprocket 40 is provided, which drives through a chain 41 a sprocket 42 around the rotary shaft 8. The chain 41, 42 is arranged in a housing 2.

FIG. 8 shows a gear wheel drive in the cutter bar 1 corresponding to FIG. 7. However, an intermediate gear wheel 44 is arranged here between the main drive and the gear wheel 43 of the rotary shaft 8.

FIG. 9 shows a driving shaft 45 corresponding with the main driving shaft 16 between the housings 2, on which shaft a pulley 46 is arranged inside the housing 2, said pulley co-operating with the pulley 47 on the rotary shaft 8. Between the pulleys is stretched a rope 48.

FIG. 10 shows a gear wheel drive in the cutter bar 1, in which the gear wheels rotate about horizontal shafts. Every third gear wheel 49 has an intermediate driving shaft 50, which is provided at the other end with a bevel gear wheel transmission 51.

FIG. 11 shows a combined timing belt-gearing transmission. The timingbelt 61 is led around suitable sprocket wheel on main driving shaft 60 and parallel to shaft 62 respectively. The parallel shaft 62 drives the bevel gear wheels transmission in the housing 63 like the transmission in FIG. 10.

The invention is not limited to the embodiments described above.

What is claimed is:

1. A mowing device comprising an elongate cutter bar assembly adapted to be traveled along a swath to be cut with the cutter bar assembly extending widthwise of the swath, said assembly including at least a pair of side-by-side rotary cutter discs of inverted generally bowl-shaped configuration and a radially projecting cutter blade on each of said discs which sweep through circular paths which overlap between the cutter discs, said assembly being of narrow height and consisting of frame components which, except for portions lying within the plan view outlines of said paths, lie below said paths, said frame components including an elongate beam lying below said paths, at least two intermediate drive support housings attached to said beam and projecting forwardly therefrom, each housing including an upstanding sleeve portion forwardly of said beam and projecting upwardly through a plane containing the path of an associated cutter blade, an upstanding shaft rotatably journaled in each sleeve portion to define an axis perpendicular to said plane and means for mounting an associated cutter disc to the upper end of each upstanding shaft, intermediate drive means supported by each housing for rotating said shafts in unison, main drive means for driving said intermediate drive means and being located adjacent to and parallel to said beam, said main drive means and said intermediate drive means both being located below said paths, cover plate means lying wholly below said plane for filling in between said housings and said beam and fixed to said housings and said beam so as to form a rigid unit therewith, and with frame components also including ground engaging means for supporting the cutter bar assembly out of contact with the ground with said plane inclined forwardly and downwardly so that said paths sweep into close adjacency to the ground just forwardly of said assembly.

2. A mowing device as defined in claim 1 wherein said cover plate means presents an undulating forward edge defining a valley disposed midway between said paths but forwardly of a line joining the axes of said shafts.

3. A mowing device as defined in claim 2 wherein said ground engaging means comprises a skid engaging the ground forwardly of said axes.

4. A mowing device as defined in claim 2 wherein said ground engaging means comprises a rotary dish and means for rotatably supporting said dish about a substantially vertical axis forwardly of the axes of said shafts.

5. A mowing device as defined in claim 1 wherein said ground engaging means comprises a skid engaging the ground forwardly of said axes.

6. A mowing device as defined in claim 1 wherein said ground engaging means comprises a rotary dish and means for rotatably supporting said dish about a substantially vertical axis forwardly of the axes of said shafts.

7. A mowing device as defined in claim 1 wherein each housing includes a tubular portion joining a sleeve portion and said intermediate drive means comprises a generally horizontal shaft and bevel gear means drivingly interconnecting each horizontal shaft with an associated upstanding shaft.

8. A device as claimed in claim 7 characterized in that the angle between the rotary shaft and the intermediate driving shaft is larger than 90°.

9. A device as claimed in claim 8 characterized in that the gear wheels are bevel gear wheels, and the vertex of the gear wheel of the intermediate shaft near the main drive is larger than that near the rotary shaft of the cutting member.

10. A device as claimed in claim 1 characterized in that the intermediate drive contains a timing belt.

11. A mowing device as defined in claim 1 wherein said main driving means comprises a series of shaft sections each journaled in one of said housings and coupling shaft means removably joining said sections between said housings.

12. A mowing device as defined in claim 1 wherein said main driving means is housed within said beam.

13. A mowing device as defined in claim 12 wherein said main driving means is a shaft.

14. A mowing device as defined in claim 12 wherein said main driving means is a series of gear wheels.

15. A mowing device as defined in claim 14 wherein said intermediate drive means are timing belts.

* * * * *